United States Patent Office 3,717,110
Patented Feb. 20, 1973

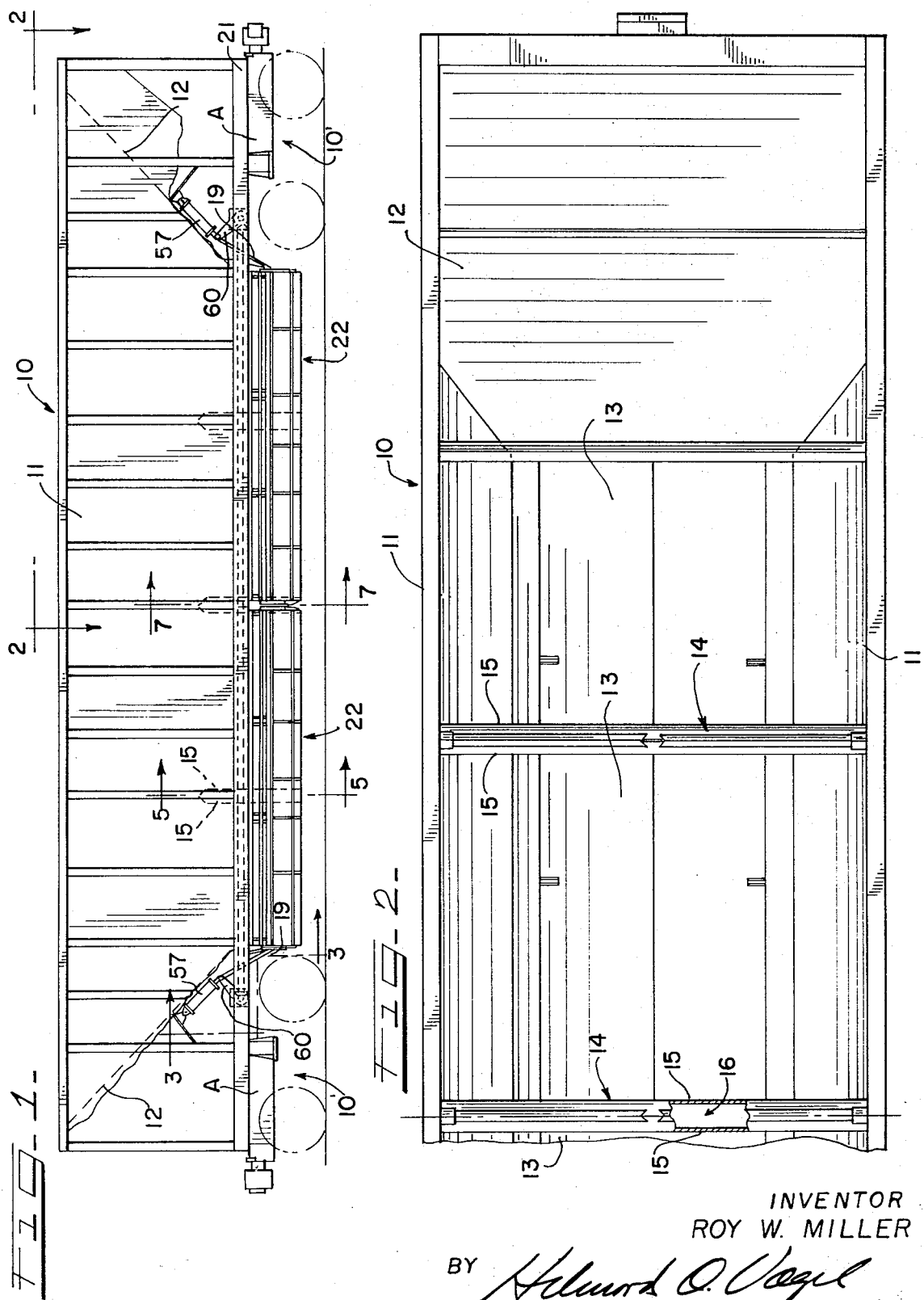

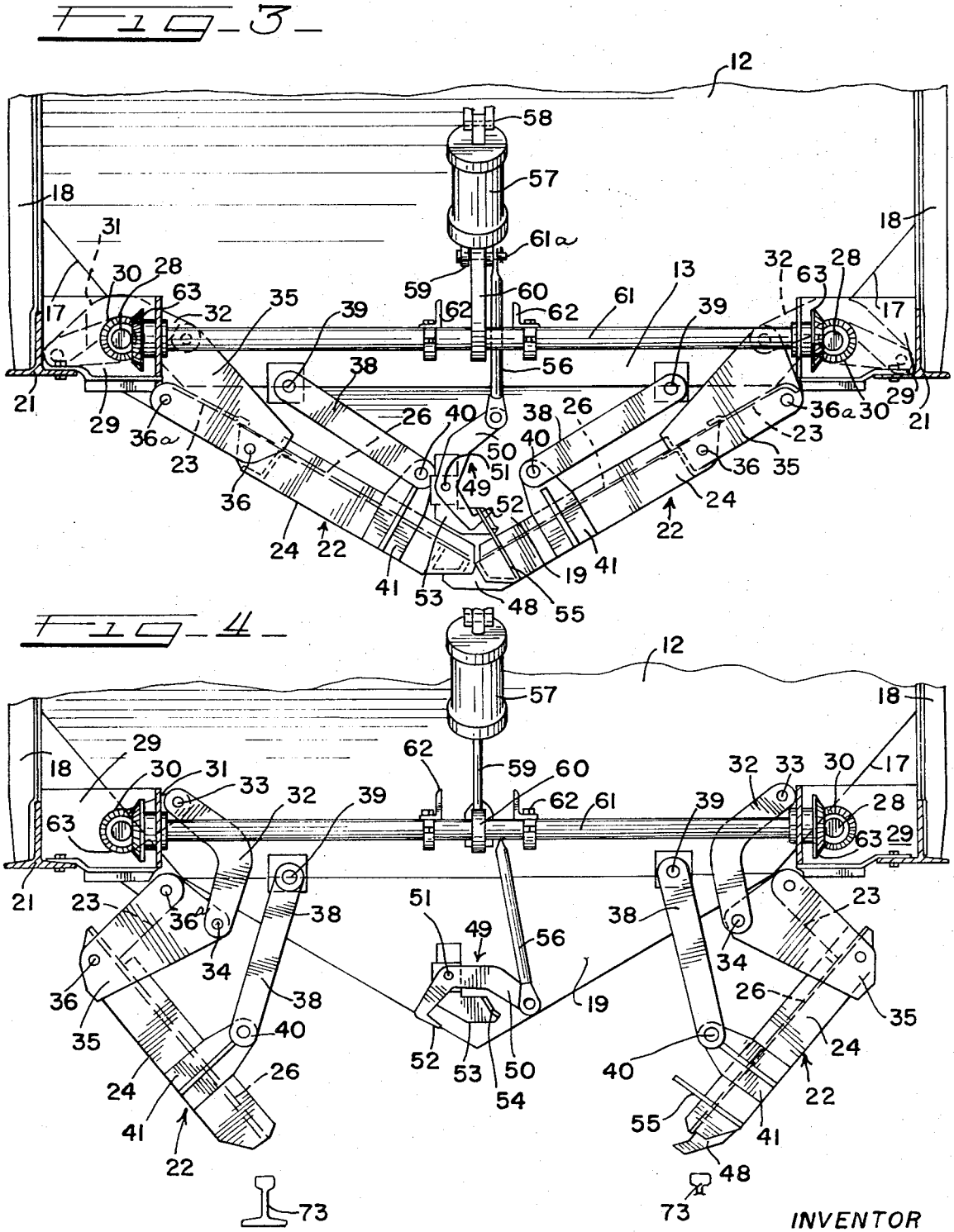

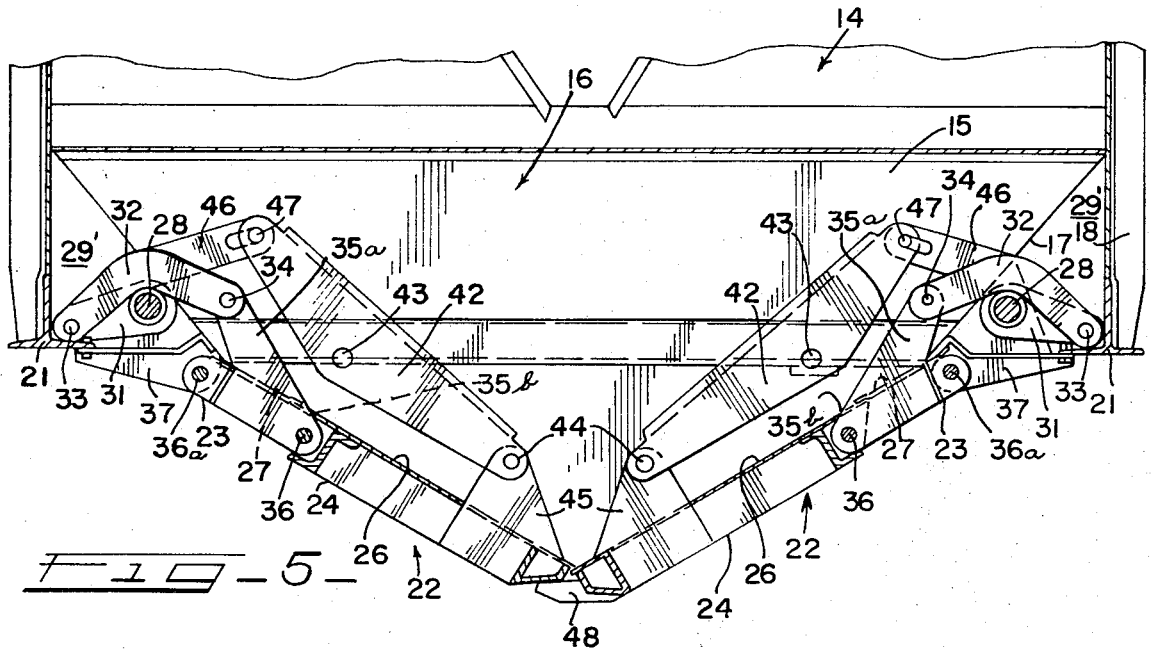
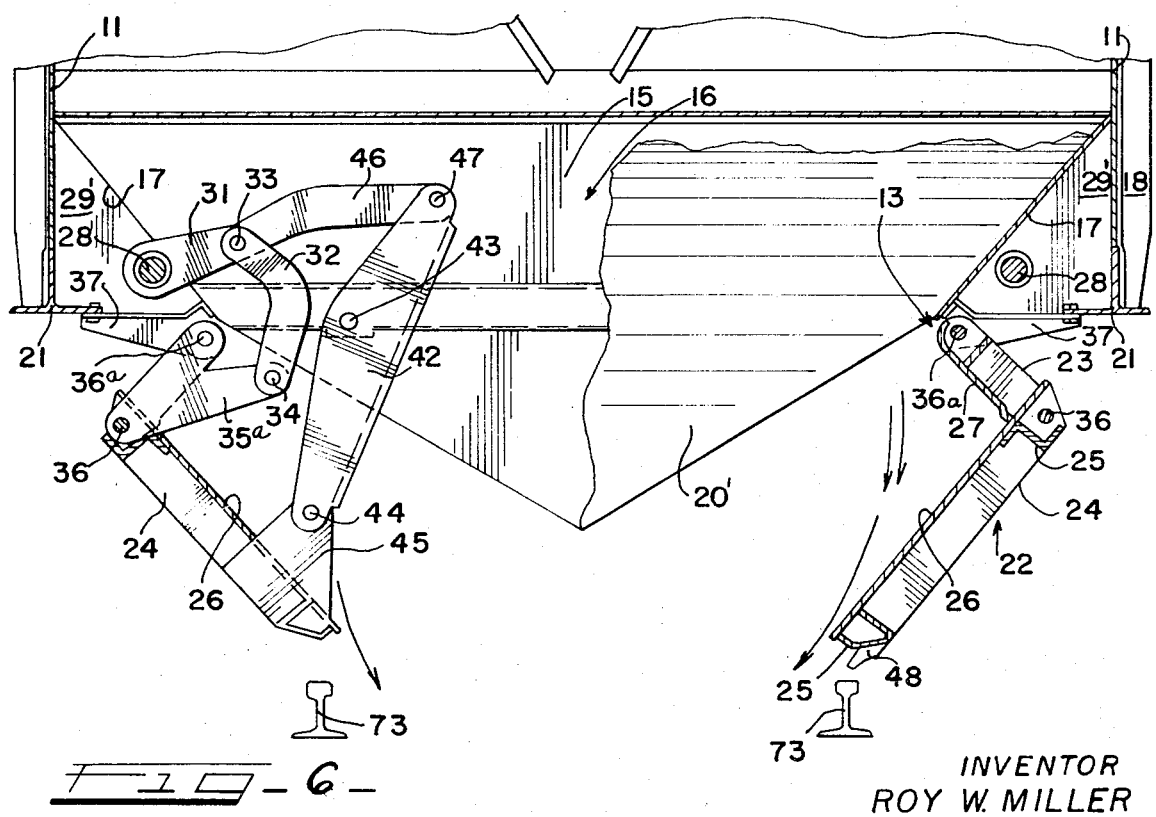

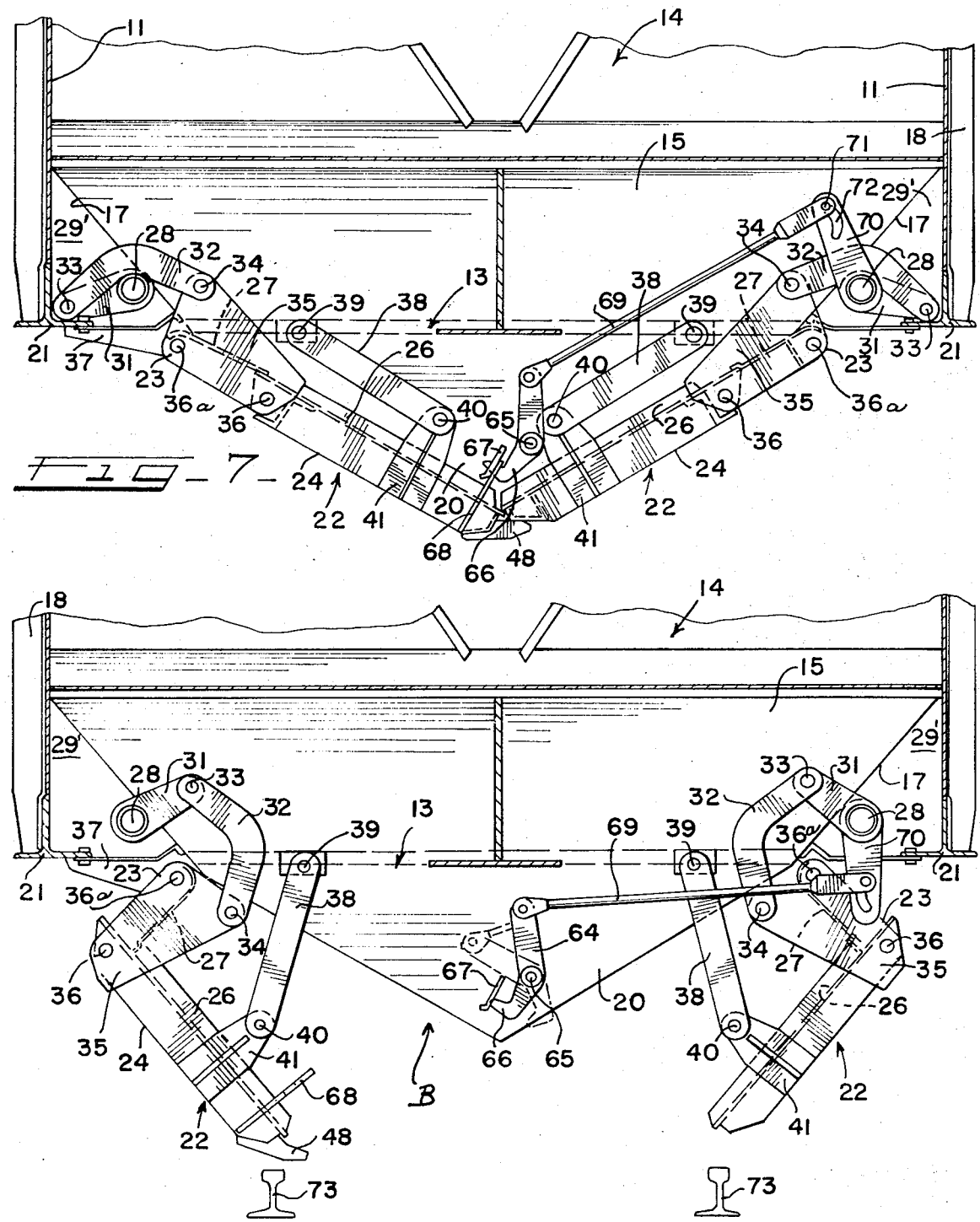

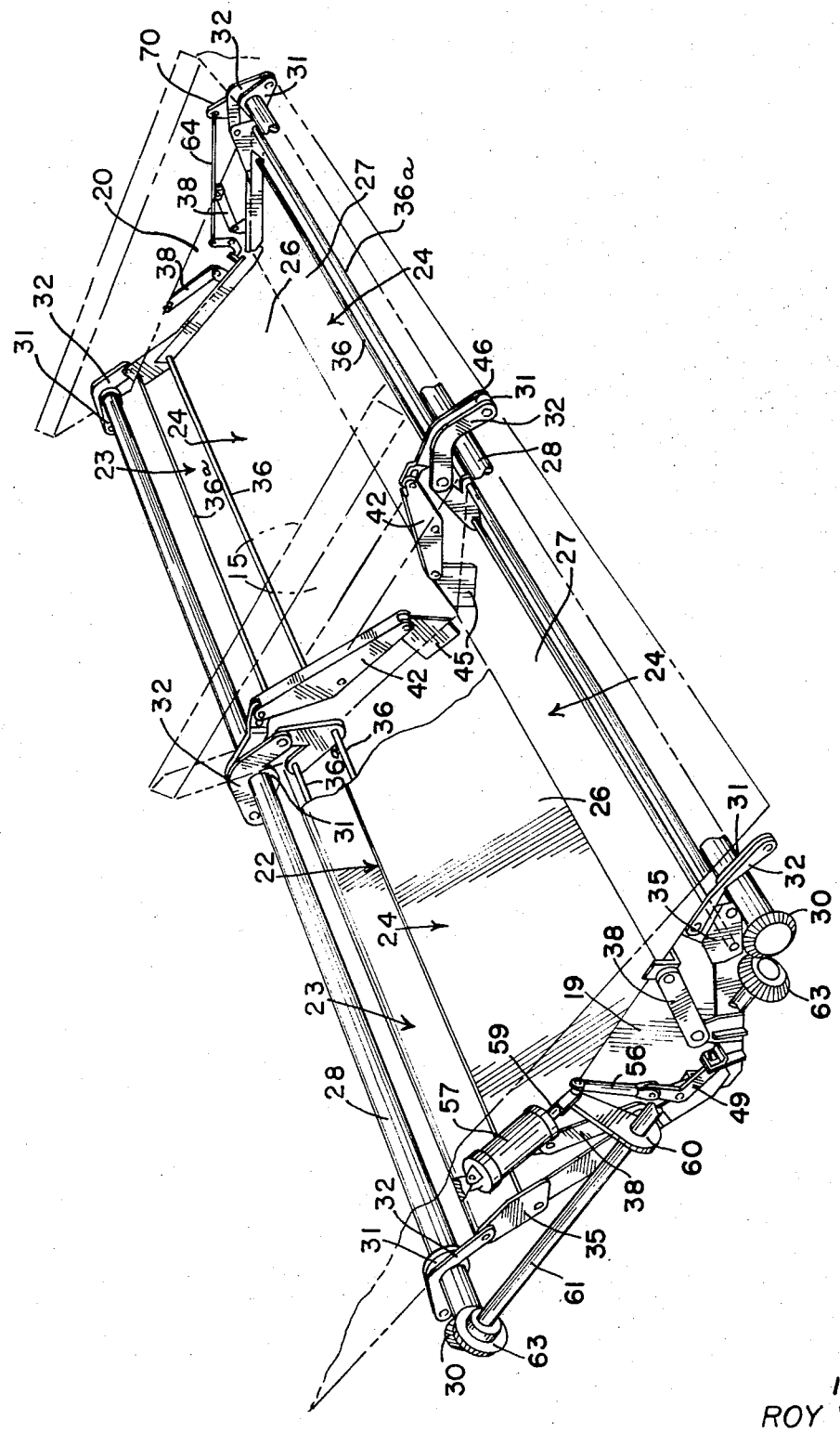

3,717,110
MOTOR ACTUATED HOPPER DOORS
Roy W. Miller, Highland, Ind., assignor to Pullman Incorporated, Chicago, Ill.
Filed July 19, 1971, Ser. No. 163,852
Int. Cl. B61d 7/04, 7/18, 7/28
U.S. Cl. 105—284                                        15 Claims

ABSTRACT OF THE DISCLOSURE

A discharge arrangement for railway hopper cars includes pivoted bottom doors relatively movable with respect to each other for opening and closing a discharge opening. The doors each include inner and outer sections pivotally interconnected which in a closed position extend substantially linearly and which during open position extend in relative angular relation. A force transmitting mechanism is provided for each door, including lever and linkage arrangements connected to the inner and outer sections, which upon actuation by a power unit mounted on the hopper car move the doors to their selective positions.

BACKGROUND OF THE INVENTION (1) Field of the invention.—The herein disclosed and described invention pertains to the field of loading mechanisms for hoppers and particularly to those which are positioned on cargo type vehicles.

(2) Description of the prior art.—The prior art relating to bottom dump arrangements for hopper cars is disclosed in such patents as 731,817; 693,132 and 3,455,253. Various linkages and door arrangements are included in the prior art in an effort to provide a positive and quick dumping arrangement which is usually accomplished through discharge openings disposed on opposite sides of a center sill of conventional design. Such dumping arrangements include doors for each discharge opening, these doors being pivotally mounted underneath said openings for movement to open and closed positions. In hopper cars wherein a center sill is utilized the discharge openings are disposed on opposite sides of the center sill and are of comparatively narrow width and thus need not be particularly wide. Opening of the doors thus in no way interferes with the rails since their lower edges will remain suspended above. Certain types of hopper cars, however, do not have the continuous center sill but are instead provided with stub sills disposed at opposite ends of the car leaving a substantially large wide discharge opening. The primary advantage of this type of construction is that materials may be much more rapidly discharged. However, in this arrangement the doors must be substantially wide and this increased width may result in interference with the rail structure or other ground structure which may be present at dumping pits. Thus, single section doors of the prior art are inadequate for the sill-less type of hopper car because of the increased width required.

SUMMARY OF THE INVENTION

It is a prime object of the present invention to provide an improved door and operating mechanism for hoppers having large width discharge openings such as is found in the sill-less type of hopper car. The present invention includes hopper doors which are swingable toward and away from each other between closed and opened positions. The doors each consists of a pair of sections which are hingedly interconnected and in the closed position assume a substantially linear configuration. Upon opening of the doors, the doors move upwardly toward the sides of the hopper car and during such movement the sections are pivoted relative to each other to assume a relatively angular or non-linear position in which they are out of the way of the material which is freely discharged through the bottom discharge opening. The opening is substantially wide and permits the free discharge of materials through the track structure to suitable dumping pits which are conventional in the art.

BRIEF DESCRIPTION OF THE DRAWINGS

FIG. 1 is a side elevational view of a hopper car embodying the invention;
FIG. 2 is a plan view taken substantially along the line 2—2 of FIG. 1;
FIG. 3 is a cross-sectional view through one end of the hopper car taken along the line 3—3 of FIG. 1;
FIG. 4 is a view similar to FIG. 3, showing another operating position of a discharge arrangement;
FIG. 5 is a cross-sectional view taken substantially along the line 5—5 of FIG. 1 showing one position of a discharge door arrangement;
FIG. 6 is a similar view of FIG. 5, showing another operating position of a door discharge arrangement;
FIG. 7 is a cross-sectional view taken along the line 7—7 of FIG. 1 and showing one position of a door discharge arrangement;
FIG. 8 is a view similar to FIG. 7 showing another operating position of the door discharge arrangement;
FIG. 9 is a schematic perspective view of a bottom door discharge arrangement.

DESCRIPTION OF THE PREFERRED EMBODIMENT

Referring now particularly to FIG. 1, a railway hopper car 10 includes opposite side walls 11 and sloping end walls 12. As best shown in FIG. 2, the car 10 is divided into a plurality of hoppers 13 by means of transversely extending structural divider walls 14 which include lower spaced wall portions 15 providing a plurality of wells 16 as best shown in FIG. 2 within which door actuating mechanisms are disposed, as will be further described. The transverse divider walls 14 also provide for structural support of the hopper car which is of a sill-less type provided at opposite ends with conventional stub-type center sill sections designated at A, which are supported on conventional wheel trucks 10'. As best shown in FIGS. 3 through 8, the side walls 11 also include downwardly converging sloping portions 17 which provide at their lower edges a discharge opening designated at B. The sidewalls 11 are further reinforced by suitable vertical side posts 18. As best shown in FIGS. 3 and 4, the end wall 12 is provided with outer downwardly extending vertical wall portions 19. FIG. 7 taken along section 7—7 o FIG. 1 is at the midpoint of the railway car 10. The divider walls 14 include lower spaced walls 15 which at the midpoint of the car are provided with downwardly extending wall portions 20 of the same shape as wall portions 19 which extend downwardly from the outer or end walls 12. The car 10 thus is divided into two major longitudinally spaced compartments which are disposed on opposite sides of the section line 7—7 and each compartment is divided into two separate hoppers 13. Each of the compartments consisting of the two hoppers includes one elongated discharge opening B, which is regulated by a pair of doors as will be presently described. FIG. 5 is taken along the line 5—5 and also shows the division of the compartments into two hoppers and the lower spaced walls 15 of this compartment also include downwardly extending wall portions 20' of the same shape as and co-extensive with the wall portions 19 and 20 hereinabove described. The hopper car structure is conventional in that inverted T-shaped side sills 21 are suitably connected to the side walls 11 as best shown in FIGS. 5 and 6 and are further supported by the vertical side posts 18.

The discharge openings B are controlled by means of doors generally designated at 22, each door including an outer door section 23 and an inner door section 24. As best shown in FIG. 6, each section 23 and 24 includes a plurality of longitudinally extending structural members 25 which are suitably connected to form a box-like construction. The inner door section 24 comprises a longitudinal extending bottom plate 26 which is adapted to interengage with a substantially flat bottom section 27 of the outer door section 23 and which in the linear position as shown in FIG. 5 forms an elongated and substantially wide bottom underneath the discharge opening.

A force transmitting mechanism or actuating arrangement for the doors includes longitudinal extending shafts 28 which are suitably supported on the sides 17 of the hopper and extend longitudinally on opposite sides of the car throughout the length of each of the compartments containing the hoppers 13. As best shown in FIGS. 3 and 4, brackets 29 are provided at the outer opposite ends of the car and project from the side sills 21 inwardly. As shown in FIGS. 3, 4 and 9, outer ends of the shaft have bevel gears or pinions 30 rigidly connected thereto. Gussets 29' also are supported on the side sills 21 and are connected to the sides 17 at longitudinally spaced positions to provide further support for the shafts 28. Opposite ends of the shaft 28 also have rigidly connected thereto throw arms 31 to which are connected bell crank levers 32 about pivots as indicated at 33. The levers 32 also are pivotally connected by means of pivots 34 to brackets 35 pivotally positioned by means of pivots 36 to intermediate and opposite ends of the door sections 24. In FIGS. 3, 4, 7 and 8, the plates or brackets 35 are identical. The brackets 35 are suitably welded to opposite ends of the sections 23 to become a rigid part thereof and to form the pivotal means from which the sections 24 are pivotally suspended. As best shown in FIGS. 5 and 6, a similar bracket is designated at 35a on each of the doors 22, the bracket 35a in this case performing the same function as the bracket 35 but being connected to the sections 23 substantially midway between the ends of said sections 23 within the middle well 16 of each compartment. As shown in FIG. 5, the lower ends of the brackets 35a project through slots 35b formed in adjacent portions of the flat plates 26 and 27. The brackets 35a are similarly pivoted by means of pivots 36 to the inner sections 24. The pivots 36, as best shown in FIG. 9, are in the form of longitudinally extending rods 36 which extend through the entire compartment for hingedly connecting together the sections 23 and 24. A similar rod 36a pivotally connects the outer sections 23 to the hopper structure by means of a plurality of brackets 37, best shown in FIGS. 5 and 7, which may be longitudinally disposed underneath the side sills 21 at the intermediate well and at the inner adjacent ends of the compartments.

Again referring particularly to FIGS. 3, 4, 7 and 8, links 38 are supported on the vertical wall portions 19 and 20 by means of pivot supports 39. The links 38 are suspended downwardly and are pivotally connected as indicated at 40 to brackets 41 secured to opposite ends of the door sections 24.

Referring now particularly to FIGS. 5 and 6 which disclose the door mechanism disposed in the intermediate well 16 of each compartment, levers 42 are pivotally connected intermediate their ends as indicated at 43 to the lower spaced wall portions 20' of the walls 15. The lower ends of the levers 42 are pivotally connected as indicated at 44 to brackets 45 suitably connected to inner ends of the inner sections 24. The upper ends of the levers 42 are pivotally connected as indicated by a slotted pivot 47 to a bell crank 46 which is pivotally connected to the throw arms 31 by means of the pivots 33. As best shown in FIG. 9, the bell crank 32 for the intermediate wall comprises a pair of spaced members between which the bell crank 46 is disposed.

As best shown in FIGS. 3 through 8, one of the door sections 24 of each of the compartments is provided with a plurality of projecting tongues 48 which in the closed position of the doors as shown in FIG. 4, support the other door section 24 in a closed position. Thus, the adjacent edges of the sections 24 are in sealing engagement and one door is supported by the tongues 48 fastened to the other door section. As indicated heretofore the wall sections 19 are provided at opposite ends of the car and project downwardly from the end walls 12. One of such wall sections 19, as shown in FIGS. 3 and 4, supports a latch and linkage arrangement generally designated at 49. Each linkage arrangement 49 includes a latch arm 50 which is pivotally connected as indicated at 51 to a bracket 53. Each latch arm 50 includes a hook shaped latch element 52. The bracket 53 includes a guide and keeper ledge 54 which, as best shown in FIG. 3, is engaged by an apertured plate 55 mounted on the outer ends of the sections 24. As best shown in FIG. 4, the apertured plate 55 is engaged by the hook catch 52 which also extends through an aperture in the keeper ledge 54. A vertical link 56 is pivotally connected to each latch member 50. Each end wall 12 at opposite ends of the car, has supported thereon a fluid extensible device in the form of a cylinder 57 suitably connected by means of brackets 58 to the walls 12. The cylinder 57 contains a reciprocable ram 59 which in turn is pivotally connected to an arm 60 rigidly connected to a transversely extending cross shaft 61. A pivot pin 61a pivotally connects the ram 59 to the arm 60 and also is pivotally connected to the end of the link 56.

The cross shaft 61 is suitably supported for pivotal movement on the end walls 12 by means of brackets 62. The ends of the shaft 61 have connected thereto bevel gears 63 which are in meshing engagement with the pinions or gears 30, connected to the shafts 28. The cross shafts 61 are also suitably supported in bearings in turn supported on the brackets 29.

Referring now to FIGS. 7 and 8, a similar latch arrangement is provided on the adjacent walls 15 and downwardly extending vertical walls 20 of the central divider wall 14, i.e., the divider wall which is positioned midway between the car and forms the end walls of each of the compartments. Each of the walls 20 of the adjacent walls 15 of the centralmost divider wall 14 is provided with the type of linkage arrangement shown in FIGS. 7 and 8, each said linkage arrangement respectively cooperating with each linkage arrangement 49 and related parts disposed on the end walls 12. Thus, separate identical door actuating mechanisms and doors are provided for each of the two compartments which each include separate hopper sections which empty through the discharge openings B. The latch arrangements shown in FIGS. 7 and 8 each include a latch arm 64 pivotally connected to a wall 20 by means of a pivot 65 and are provided at their ends with a hook latch 66 adapted to extend through an apertured plate 68 on the inner door section 24 and an apertured ledge or keeper element 67, similar to the guide and keeper ledge 54. A link 69 is pivotally connected to the latch arm 64 and as best shown in FIG. 7 is pivotally connected to a throw arm 70 by means of a pivot 71 slidable in a slot 72 in the arm 70. A track in the form of track rails 73 is disposed beneath the openings B through which the material may be dumped for delivery to a pit as is conventional in the art.

OPERATION

Upon actuation of the extensible device 57 the ram 59 moves the lever 60 from the position shown in FIG. 3 to the position shown in FIG. 4 whereupon the shaft 61 is simultaneously rotated. The link 56 causes pivotal movement of the latch element 50 whereupon the hook hatch 52 is disengaged with respect to the apertured plate 55. Rotation of the shafts 28 provides rotating movement of the throw arms 31 which actuate the bell cranks 32 and 46 to move from the over-center position shown in FIGS. 3 and 5 to the position shown in FIGS. 4 and 6, with the doors in an open position. As shown in these figures, in the open position, the door sections 23 and 24 have moved from the linear position of FIGS. 3 and 5 to the relatively angular position of FIGS. 4 and 6. In this position the sections 23 diverge outwardly and the sections 24 converge inwardly. By this arrangement the lower ends of the doors are suspended upwardly above the tracks and no problems of interference are presented, yet a very wide opening results which is one of the advantages in the design of a sill-less hopper car. The latch elements shown in FIGS. 7 and 8 function similarly to the latch elements of FIGS. 3 and 4 in that upon rotation of the shaft 28 on the right hand side as shown in FIGS. 7 and 8, the latch arm 64 is rotated and the hook latch 66 is disengaged from the apertured plate 68 simultaneously with the disengagement of the latch and linkage arrangement 49.

Closure of the doors is effected by retraction of the ram 59 providing for counter-rotation of the shaft 61 in turn rotating the shafts 28 whereupon upon the levers 42 are rotated and the bell cranks 32 again are moved to the position shown in FIGS. 5 and 7. By virtue of the link and lever geometry, the doors again assume their linear position and effectively close the discharge opening.

Thus, an improved linkage and lever geometry provide for effective regulation of a wide discharge opening such as is afforded by a sill-less hopper car.

What is claimed is:

1. A bottom discharge arrangement for discharging a load from a vehicle having a hopper structure, said hopper structure including horizontally spaced frame members providing therebetween a discharge opening comprising:
   first and second doors, each including first and second sections movable between open and closed positions relative to said opening,
   means pivotally connecting said first section to said spaced frame members,
   means pivotally interconnecting said second sections to said first sections,
   said second sections having edge portions in the closed position being disposed in contiguous relation, and
   force transmitting linkage and lever means pivotally connected to said frame members and pivotally connected to said first and second doors for moving said doors to said positions,
   and whereby in the open position of said doors said first and second sections are disposed in relative angular relation.

2. The invention in accordance with claim 1, wherein said open position and said first sections diverge outwardly, and said second sections converge inwardly with respect to said opening.

3. The invention in accordance with claim 1, said force transmitting means comprising first and second levers for each door respectively pivotally connected to said first and second sections and means pivotally supporting said levers from said frame members.

4. The invention in accordance with claim 3, wherein the closed position said interconnected sections of each door are disposed in substantially linear relation and in said open position said sections are disposed in relative angular relation.

5. The invention in accordance with claim 4, said second levers being spaced inwardly from said frame members and being connected to said second sections adjacent said edge portions,
   said means pivotally interconnecting said second sections to said first sections including bracket means and providing said means to connect said first sections to said spaced frame members, said first levers being pivotally connected to said bracket means, and
   actuating means connected to said first levers for swinging said bracket means and said sections about said connecting means on said frame members.

6. The invention in accordance with claim 5, said first levers having a bell crank configuration,
   said actuating means including a pair of laterally spaced shafts rotatably mounted on said frame members, and
   a throw arm connected to said shafts for rotation therewith and pivotally connected to said first levers.

7. The invention in accordance with claim 6, wherein the closed position of said doors, the points of pivotal connection of said bell crank levers to said throw arms are disposed laterally outwardly of said rotatable shafts.

8. The invention in accordance with claim 7, said actuating means including fluid extensible means supported on said arrangement for rotating said shafts.

9. The invention in accordance with claim 7, said actuating means including first rotatable driven means on said shafts, a transverse shaft rotatably supported on said arrangement between said shafts and including drive means at opposite ends thereof engaging said driven means,
   a crank arm rigidly connected to said transverse shaft, and
   a fluid extensible means connected to said arrangement including reciprocating means pivotally connected to said crank arm.

10. The invention in accordance with claim 9, including latch means mounted on said hopper and releasably securing said doors in the closed position, and
    means connected to said latch means, and
    said extensible device responsive to actuation of said device for releasing said doors.

11. The invention in accordance with claim 1, said force transmitting means for each door comprising:
    a throw arm pivotally mounted on said hopper structure,
    a first lever pivotally connected to said throw arm and to said first section,
    a second lever pivotally connected intermediate its ends to said structure,
    means pivotally connecting one end of said second lever to said second section, and
    a third lever pivotally connected to said throw arm and to the other end of said second lever.

12. The invention in accordance with claim 11, said first and second levers being of bell crank configuration.

13. The invention in accordance with claim 12, said force transmitting means including a shaft rotatably connected to said structure for moving said throw arm,
    said bell crank levers in the closed position of said doors having their pivotal points of connection disposed outwardly of said shaft and spaced from the axis thereof in an over-center position.

14. The invention in accordance with claim 1, said force transmitting means for each door comprising:
    a throw arm pivotally mounted on said hopper structure,
    a first lever pivotally connected to said throw arm and said first section, and a link pivotally connected to said hopper structure and said second section.

15. The invention in accordance with claim 14, said first lever being of bell crank configuration.

References Cited

UNITED STATES PATENTS

| | | | |
|---|---|---|---|
| 693,132 | 2/1902 | Heiden | 105—290 X |
| 731,817 | 6/1903 | Russell | 105—299 X |
| 938,976 | 11/1909 | Clark | 105—282 R X |
| 2,723,878 | 11/1955 | Rockwell | 105—250 X |
| 3,339,500 | 9/1967 | Dorey | 105—304 X |
| 3,455,253 | 7/1969 | Floehr | 105—290 X |

DRAYTON E. HOFFMAN, Primary Examiner

H. BELTRAN, Assistant Examiner

U.S. Cl. X.R.

105—240, 299, 306